Patented Mar. 23, 1954

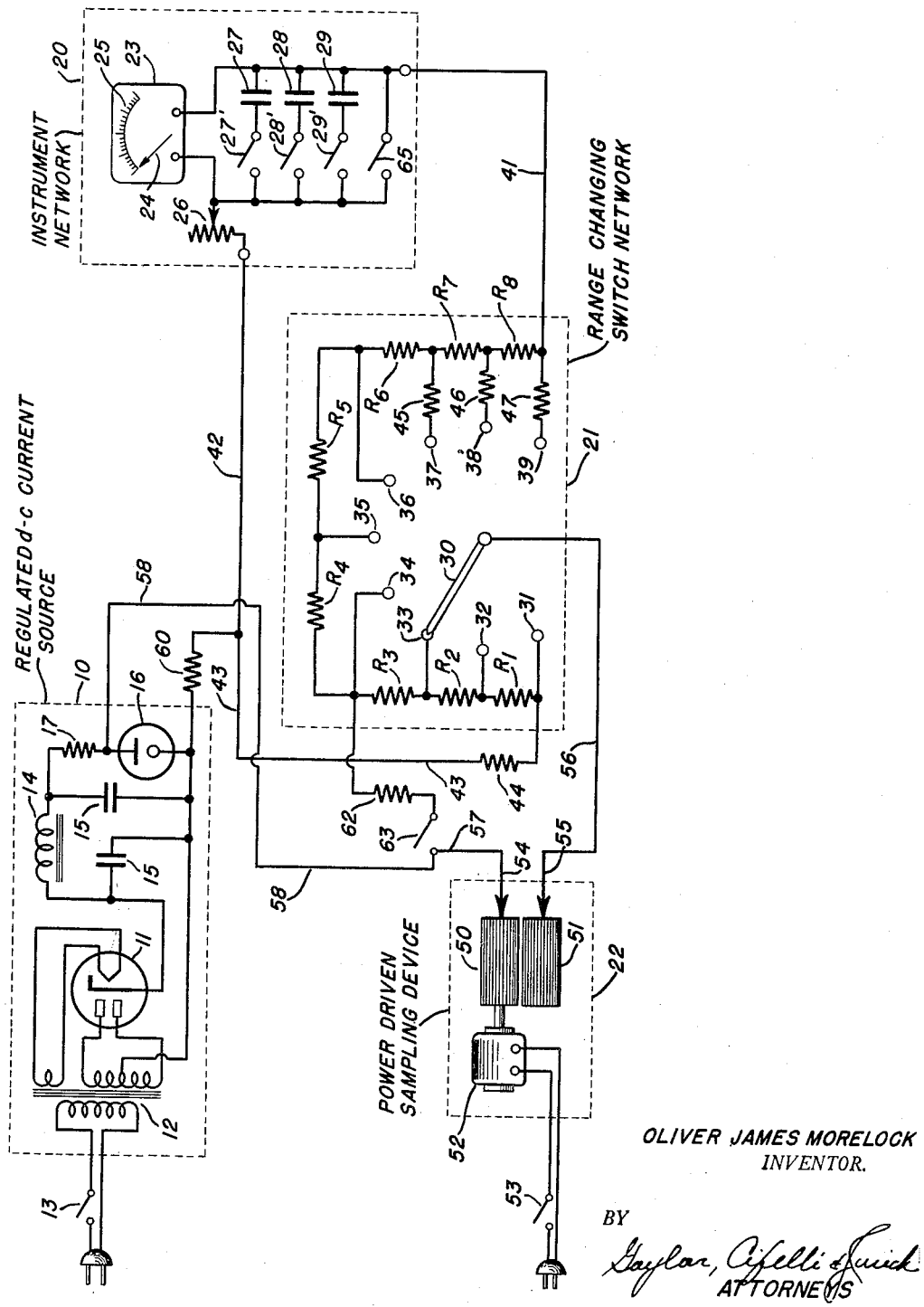

2,673,327

UNITED STATES PATENT OFFICE 2,673,327

MOISTURE TESTING APPARATUS

Oliver James Morelock, Short Hills, N. J., assignor to Weston Electrical Instrument Corporation, Newark, N. J., a corporation of New Jersey Application March 15, 1952, Serial No. 276,789

2 Claims. (Cl. 324—65)

This invention relates to moisture testing apparatus and more particularly to a novel electrical circuit for a conductivity type moisture meter.

In moisture testing apparatus of the type contemplated by this invention the material to be tested is passed between a pair of metal spaced rollers that are electrically insulated from each other. The rollers are connected in a suitable electrical network which includes a sensitive, D.-C. indicating instrument. A regulated, D.-C. potential is applied to the network and the current flowing through the indicating instrument depends upon the electrical conductivity of the material that is fed between the two rollers. In general, the instrument scale is calibrated directly in conductance values and the moisture content is determined by reference to suitable charts or tabulations wherein the instrument readings are related to moisture values for the particular material being tested, such as grain, seeds, nuts, etc. When the apparatus is designed for the testing of a single material the instrument scale may, of course, be calibrated directly in moisture content values.

In moisture testing apparatus of this type, the indicating meter indicates the average value of the current flowing through one or more discrete particles of the material passing between the two rollers. If the material feeding through the rollers is of uniform cross section and conductivity a steady, continuous instrument-pointer deflection results. In practice, however, this condition is rarely encountered since most grains, nuts, seeds, etc., have odd configurations. Further, the conductivity may vary considerably due to the different moisture content of the individual particles, especially where wet and dry particles have been mixed together in a storage bin, freight car or etc. There are also instances where small particles of metal, or other conducting material may be included in the test material causing momentary short-circuits between the two rollers and producing a spurious meter indication of excessive amplitude.

The above-stated practical considerations, relating to conductance type moisture meters, present conflicting requirements in the design of the apparatus. It is, of course, desirable to design the indicating instrument for high sensitivity and high speed of response so that it will respond to small changes in the moisture content of the material being tested. On the other hand, rapid and wide fluctuations of the instrument pointer make it difficult, if not impossible, to obtain a good average reading for a given quantity of material passing continuously between the rollers.

I overcome the shortcomings of present moisture testers by providing simple, selectively-operable means whereby the operator can change the response characteristics of the indicating instrument to meet particular conditions. This is done without imposing undesirable restrictions upon the overall design of the apparatus such as providing a multi-range device adapted for use in testing widely-varying materials, or providing a maximum instrument sensitivity at the relatively low ranges.

An object of this invention is the provision of mosture testing apparatus of the conductance type wherein the response characteristics of the indicating instrument may be altered by the operator to meet particular conditions arising in the actual testing of given materials.

An object of this invention is the provision of a moisture tester of the type wherein the moisture content of a material is determined from the electrical conductivity of the material as it passes between two, spaced rollers said tester including an indicating instrument responsive to the current flowing through the material and manually-operable means for changing the time constant of the instrument.

An object of this invention is the provision of moisture testing apparatus comprising a pair of spaced rollers between which is passed the material to be tested, a D.-C. indicating instrument circuit including one or more capacitors selectively connectable across the instrument, a range-changing switch selectively operable to change the full scale sensitivity of the instrument, means for maintaining a constant resistance external of the instrument circuit regardless of the setting of the range-changing switch, a source of constant D.-C. potential for impressing a current flow through the instrument in accordance with the conductivity of the material passing between the rollers and adjustable means for standardizing the instrument sensitivity to condition the apparatus for proper use.

These and other objects and advantages of the invention will become apparent from the following description when taken with the single drawing which is a circuit diagram of a moisture meter made in accordance with my invention.

Essentially, the circuit comprises a sensitive, D.-C. indicating instrument, a range-changing switch, a voltage-regulated D.-C. current supply, a pair of motor driven rollers and suitable network elements whereby the indicating instrument responds to current flowing through the test material passing between the rollers. The current source 10 comprises a rectifier tube 11 having its electrodes energized by a suitable transformer 12 whose primary winding is energized from a conventional 60 cycle power supply line upon closure of the line switch 13. The rectifier tube and the following filter network, comprising the choke 14 and capacitors 15, supplies filtered D.-C. current to the regulator tube 16 through the resistor 17.

Within the current-regulating range of the tube 16, a low resistance, direct current supply is available for operation of the other components of the moisture-testing apparatus. Such other components, of major interest for purposes of description comprise the indicating instrument network 20, the range-changing-switch network 21 and the motor-driven sampling device 22.

The instrument network includes a D.-C. indicating instrument 23 having a pointer 24 co-operating with a suitable scale 25, an adjustable resistor 26 and the capacitors 27, 28, 29 individually connectable in shunt across the instrument by closure of the associated switches 27', 28', 29'. The instrument 23 is of the permanent magnet-movable coil type having a full scale sensitivity of the order of 5–6 microamperes and the scale 25 preferably is calibrated in values related to the conductance of the material to be tested. The movable coil of the instrument has an effective resistance of several thousand ohms whereby the damping of the coil rotation can be controlled by the selective insertion of one of the capacitors 27, 28, 29 across the meter terminals, provided the circuit external to the meter circuit is maintained at a relatively high, substantially constant impedance. The latter condition is met by a suitable switching and circuitry arrangement as will be described below.

The range-changing switch 21 comprises a movable arm 30 and a plurality of cooperating stationary contacts 31–39, inclusive, with the fixed resistors $R_1$ to $R_8$, inclusive, connected between the stationary contacts as shown. It will be apparent that the series resistors $R_1$ to $R_8$ are connected in parallel with the instrument network by the lead 41, connected between one side of the instrument and the switch contact 39, and the leads 42, 43 and resistor 44 connected between the other side of the instrument and the switch terminal 31. Therefore, the total resistance represented by the switch resistors $R_1$–$R_8$ and the series resistor 44 is connected in shunt across the meter network at all times and irrespective of the setting of the switch arm 30. The resistors $R_1$–$R_8$ form a tapped-ring shunt which, in practice, is set up for a 3 to 1 current ratio on succeeding stages and the switch arm 30 is utilized to select the correct instrument current range corresponding to the electrical conductance range of the material to be tested. Thus, a maximum of current is caused to flow through the instrument network when the switch arm 30 is set to contact the stationary contact 39, as will be described in more detail hereinbelow. The fixed resistors 45, 46, 47, interposed between the stationary switch contacts 37, 38, 39, respectively, and the ring shunt, are each of relatively high ohmic values to maintain a high external circuit resistance to the meter network so that constant instrument damping will be available for all settings of the range-selector switch 21. Effectively, the shunting impedance across the meter network is maintained at a relatively high value on the more sensitive instrument ranges by virtue of the high resistance shunts $R_6$ to $R_8$ and such relatively-high shunting impedance is maintained on the higher instrument ranges by virtue of the resistors 45 to 47 operating in conjunction with the resistors $R_6$ to $R_8$. Effectively, the resistors 45 to 47 can have a predetermined ohmic value to provide the constant external meter circuit impedance and still fall within a small fraction of 1% of the effective resistance of the material under test for moisture content. Stated in another way, these resistance values can be calculated to provide the required external circuit resistance and still be of sufficiently low value to avoid any appreciable error in the meter reading on the three (3) high sensitivity ranges of the apparatus as represented by the setting of the switch arm 30 on either of the stationary contacts 37 to 39. Further, the resistors 45 to 47 may be considered as current limiters to avoid excessive, momentary current surges through the indicating meter due to short-circuiting particles present in the material under test.

The power-driven sampling device 22, for establishing electrical contact with the material under test, comprises the spaced rollers 50, 51, the former being driven by a motor 52 that is energized upon closure of the line switch 53. In practice, the motor is coupled to the roller 50 through a reduction gearing to provide a substantially constant roller rotation of approximately 30 R. P. S. These rollers have splined, or serrated, surfaces and are electrically insulated from each other. As is well known in this art, the material to be tested is gravity-fed between the two rollers from a suitable hopper and the spacing between the two rollers is so set that each roller makes good contact with the individual material particles as they are forced downwardly between the rollers. Electrical contact to the rollers is made by suitable brushes 54, 55, the brush 55 being connected to the range-selector switch arm 30 by the wire 56 and the brush 54 being connected to one side of the current supply 10 by the wires 57, 58.

When a conducting material is passing between the two rollers current will flow through the various networks in the following paths. The lead 58, roller 50, the material particles, roller 51, lead 56, and switch arm 30. Here the current divides into two parallel paths, namely, (1) the ring shunt resistors $R_2$, $R_1$, resistor 44 and lead 43, and (2), the ring shunt resistors $R_3$–$R_8$, inclusive, lead 41, instrument 23, resistor 26 and lead 42. The leads 42 and 43 each are connected to the current-limiting resistor 60 that is, in turn, connected to the other side of the current source. The actual magnitude of the currents flowing in the two parallel paths is, of course, inversely related to the total series resistance of such paths. It will, therefore, be apparent that the setting of the switch arm 30 establishes the portion of the total current which will flow through the indicating instrument whereby the setting of such switch determines the range of the apparatus. If the material under test has a relatively high conductivity the switch arm will be set to engage the stationary contact 31 whereby most of the current will flow through the instrument-shunting path comprising the resistor 44. If, on the other hand, the conductivity of the material under test is relatively low, the switch arm will be set to engage the contact 39 whereby most of the current will flow through the indicating instrument. Upon proper consideration being given to the average conductivity of the test materials, the voltage of the current source and the resistance values of the various resistors including the resistance of the indicating meter, the contact positions of the range-selector switch can be marked with the names of specific materials for which the apparatus has been designed.

It may here again be pointed out that a specific setting of the range-selector switch does not alter the total shunting resistance across the indicating meter. As has been stated, above, the meter resistance is several thousand ohms and, likewise, the external circuit impedance is high and substantially constant, whereby the damping of the meter can be controlled by the selective insertion of capacitors 27, 28, 29, across the meter terminals. This method of meter damping is quite effective since the current pulses, arising by reason of the passage of material particles between the two rollers, are square wave in character and have a relatively high, effective frequency on the leading edge. Under such conditions the reactive character of the capacitors tends to render a very effective damping medium for a D.-C. microammeter indicating the average value of a fluctuating, unilaterally-conducting current.

In practice, the switches 27', 28', and 29' are of the normally-open type. If the conductivity of the individual particles of the material under test is fairly uniform, readings of the instrument indications are made without difficulty. If, however, the particle conductivity varies considerably, the pointer of the indicating instrument will fluctuate rapidly over a wide scale range making it difficult, if not impossible, for the operator to obtain a true average reading. In such case, the operator closes the switch 27' thereby damping the instrument indications to an extent determined by the value of the capacitor 27. If such procedure does not provide sufficient instrument damping the operator closes the switch 28' thereby placing the larger capacity capacitor 28 across the instrument. A still higher instrument damping rate is obtained by closure of the switch 29' connected to the still larger capacitor 29. In the commercial form of the invention, the normally-open switches 27', 28', 29' are disposed near the instrument and, in fact, can be carried by the instrument housing, to facilitate conditioning the apparatus for undamped or damped indications of the meter. These switches are of the push-button, spring return type with a mechanical lock-in position effective to retain the switch in the closed position when desired. The undamped meter indications provide useful information inasmuch as the extreme pointer fluctuations correspond to the maximum and minimum moisture content values of the test material, whereas the damped meter indications provide a pointer indication corresponding to the average moisture content of such material.

In apparatus of this type it is desirable to provide the operator with a means for checking the operating condition of the apparatus prior to actual use. For this purpose I provide a standard resistor 62 which can be connected into the circuit by closure of the normally-open switch 63. It will be noted that the standard resistor 62 effectively is connected across the rollers 50, 51 when the switch arm 30 is in the illustrated position and the switch 63 is closed. Thus, when the rollers are free of material, the current flowing through the instrument in determined by the ohmic value of the standard resistor which value is chosen to produce a top scale deflection of the instrument pointer for a given setting of the range-selector switch. Precise alinement of the pointer with the top scale mark is accomplished by appropriate adjustment of the variable resistor 26. Once such instrument adjustment is made, the switch 63 is opened and the apparatus is ready for use. While I have shown the standard resistor connected to an intermediate contact on the range-selector switch, those skilled in this art will understand that the range-changing switch 21 and the standardizing switch 63 can be combined in a multi-deck rotary, switch with a separate position for standardizing purposes. In fact, it is desirable to provide an interlocking arrangement whereby closure of the standardizing switch 63 is ineffective unless the arm 30, of the range-changing switch is in proper position as the value of the standardizing resistor 62 is calculated to provide a top-mark instrument deflection under predetermined network conditions.

The switch 65, associated with the instrument network, is of the lock-closed type and is provided for short-circuiting the highly sensitive meter during shipment or when the apparatus is transported from one location to another.

All components illustrated in the drawing, with the exception of the motor and rollers, are contained within a suitable housing carrying two connection terminals to which the sampling device 22 is connected by means of two wires.

Having now described my invention in accordance with the patent statutes which I desire to protect by Letters Patent is set forth in the following claims.

I claim:

1. In moisture testing apparatus of the conductivity type comprising a direct current source, a pair of metal, spaced rollers electrically insulated from each other and between which is passed the material to be tested, and a direct current instrument having a calibrated scale and a pair of input terminals, the combination of a range-changing switch including a series of stationary contacts and a cooperating movable arm, said arm being connected to one of the rollers; a plurality of calibrated resistors connected in series to form a tapped-ring shunt having a total resistance substantially greater than that of the instrument; leads connecting the first shunt resistor directly across the first and second switch contacts; leads similarly connecting some of the adjacent shunt resistors directly across adjacent switch contacts; circuit elements including separate current-limiting resistors connecting the remaining shunt resistors across the remaining switch contacts, each of said current-limiting resistors having a resistance greater than that of the instrument; a lead connecting one instrument terminal to one side of the current source and to the first switch contact; a lead connecting the other instrument terminal to the common connection between the last shunt resistor and the current limiting resistor that is connected to the last switch contact; a lead connecting the other side of the current source to the other roller; a capacitor and a selectively-operable switch for connecting the capacitor across the instrument terminals.

2. The invention as recited in claim 1, including a standardizing resistor of predetermined resistance, and circuit elements including a normally-open switch for connecting said standardizing resistor in parallel with the two rollers.

OLIVER JAMES MORELOCK.

References Cited in the file of this patent
UNITED STATES PATENTS

| Number | Name | Date |
|---|---|---|
| 1,826,247 | Heppenstall | Oct. 6, 1931 |
| 2,270,732 | Jones | Jan. 20, 1942 |
| 2,553,754 | Dietert et al. | May 22, 1951 |
| 2,576,772 | Bernet et al. | Nov. 27, 1951 |